(12) United States Patent
Ulinski et al.

(10) Patent No.: US 8,676,741 B2
(45) Date of Patent: Mar. 18, 2014

(54) DYNAMIC HEURISTIC WEB PAGE CACHING BASED ON THE USER'S RECENT PAGE VISITS

(75) Inventors: John Ulinski, Scottsdale, AZ (US); Manish Dixit, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 299 days.

(21) Appl. No.: 13/162,040

(22) Filed: Jun. 16, 2011

(65) Prior Publication Data

US 2012/0323838 A1     Dec. 20, 2012

(51) Int. Cl.
   *G06F 9/44*     (2006.01)
   *G06N 7/02*     (2006.01)
   *G06N 7/06*     (2006.01)

(52) U.S. Cl.
   USPC .......................................................... 706/52

(58) Field of Classification Search
   USPC .......................................................... 706/52
   See application file for complete search history.

(56) References Cited

U.S. PATENT DOCUMENTS

| 7,275,243 B2 * | 9/2007 | Gibbons et al. ............... 717/159 |
| 7,647,550 B1 | 1/2010 | Nguyen |
| 7,962,510 B2 * | 6/2011 | Najork et al. .................. 707/771 |

OTHER PUBLICATIONS

Darin Fisher, Mar. 3, 2003, https://developer.mozilla.org/en/link_prefetching_faq.

* cited by examiner

*Primary Examiner* — Michael B Holmes
(74) *Attorney, Agent, or Firm* — MH2 Technology Law Group LLP (57) ABSTRACT

In accordance with aspects of the present disclosure, a method, product, apparatus and system is disclosed. The method includes monitoring, by a processor, a predetermined number of web pages viewed by a user; determining a likelihood that the user is interested in a related web page based on previously viewed web pages; comparing the determined likelihood against a predetermined threshold value; and preloading the related web page for viewing by the user if the determined likelihood is greater than the predetermined threshold value.

17 Claims, 5 Drawing Sheets

DYNAMIC HEURISTIC WEB PAGE CACHING BASED ON THE USER'S RECENT PAGE VISITS

FIELD OF THE DISCLOSURE

The present application is directed to dynamic preloading of web pages.

BACKGROUND OF THE DISCLOSURE

In many working environments, a user is required to access a plurality of web pages to perform a particular job duty. In some cases, it can take substantial time to transmit web pages from the web server to the web browser. This problem is particularly acute when the web server has other demands on its processing power, when the web page is laden with data or graphics, or when the communication link between the web server and the web browser has low communication bandwidth. An operator of the web browser perceives substantial transmission time as excessive latency in loading the web pages and slow display of embedding graphics, each of which can slow the user's job duty performance.

What is needed is an improved method to determine a likelihood that a particular user is interested in a related web page based on previously viewed web pages and pre-load that web page or similar web pages before the user has requested other web page.

SUMMARY OF THE DISCLOSURE

In accordance with aspects of the disclosure, a method is disclosed. The method can include monitoring a predetermined number of web pages viewed by a user; determining a likelihood that the user is interested in another web page based on previously viewed web pages; comparing the determined likelihood against a predetermined threshold value; and preloading the related web pages for viewing by the user if the determined likelihood is greater than the predetermined threshold value.

In some aspects, the method can also include displaying the preloaded related web page and/or determining if the predetermined number of web pages is greater than a threshold value. The predetermined number of web pages and the related web page can have a predetermined relationship. The threshold value can be based on a time frame and a number of web page views. The number of web page views can be about between 50 and 200, for example, about 100 and the time frame can be about between 3 and 15 days, for example, about 7 days. These thresholds are configurable and can be calculated for different environments separately. In some aspects, the predetermined relationship can include a sequence of web pages for a web-based application, for example a service management application.

In accordance with aspects of the disclosure, an apparatus is disclosed. The apparatus can include a controller in communication with machine-readable medium that when executed by the controller can cause the controller to: monitor a predetermined number of web pages viewed by a user; determine a likelihood that the user is interested in another web page based on previously viewed web pages; compare the determined likelihood against a predetermined threshold value; and preload the related web page for viewing by the user if the determined likelihood is greater than the predetermined threshold value.

In some aspects, the controller can be configured to cause the preloaded related web page to be displayed on a display and/or the controller can be configured to determine if the predetermined number of web pages is greater than a threshold value. The predetermined number of web pages and the related web page can have a predetermined relationship. The threshold value can be based on a time frame and a number of web page views. The number of web page views can be about between 50 and 200, for example, about 100 and the time frame can be about between 3 and 15 days, for example, about 7 days. These thresholds are configurable and can be calculated for different environments separately. In some aspects, the predetermined relationship includes a sequence of web pages for a web-based application, for example, a service management application.

In accordance with aspects of the disclosure, an article of manufacture is disclosed and can include a machine-readable medium that when executed by a controller can cause the controller to: monitor a predetermined number of web pages viewed by a user; determine a likelihood that the user is interested in another web page based on previously viewed web pages; compare the determined likelihood against a predetermined threshold value; and preload the related web page for viewing by the user if the determined likelihood is greater than the predetermined threshold value.

Additional embodiments and advantages of the disclosure will be set forth in part in the description which follows, and can be learned by practice of the disclosure. The embodiments and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate several embodiments of the disclosure and, together with the description, serve to explain the principles of the disclosure.

DESCRIPTION OF THE EMBODIMENTS

Reference will now be made in detail to various exemplary embodiments of the present application, examples of which are illustrated in the accompanying drawings. Wherever possible, the same reference numbers will be used throughout the drawings to refer to the same or like parts.

Intelligent page load refers to a process where a user's past behavior of accessing web page will be used to predict and pre-load pages which have a high probability of being accessed next. Although aspects of the present disclosure will be described in terms of a production-like environment where the sequence of pages an operator will visit is influenced mainly by the job he or she is assigned to perform, the present disclosure is not limited to this example. Any set of web pages having a relationship may be monitored and a determination may be made as to a likely set of other web pages that the user may wish to view. By way of one non-limiting example, after monitoring a user's behavior for a predetermined time period or predetermined number of page visits, after user visits page "A," the user typically visits pages "B" or "C" instead of pages "D" or "E," where "A"-"E" represents separate web pages having a predefined relationship. By using aspects of the present disclosure, pages "B" and "C" can be preloaded after the user visits page "A," thus improving the user's experience by not having to wait for pages to be requested and loaded on the user's computer. The predefined relationship can include Page "A" containing supporting information related to the data that Page "B" is displaying to the user.

In one non-limiting example, in a large and complex Help Desk/Asset Management application such as Xerox Services Manager (XSM) different operators are required to perform many diverse and varied jobs. Depending on the specific job being performed, a fixed and somewhat predictable set of pages within the application will be used to perform a sequence of tasks (i.e., page visits) needed to complete that job. In such a production environment, this sequence of page visits will become repetitive and can be used to pre-load the right set of pages needed to perform that job.

Figure 1:
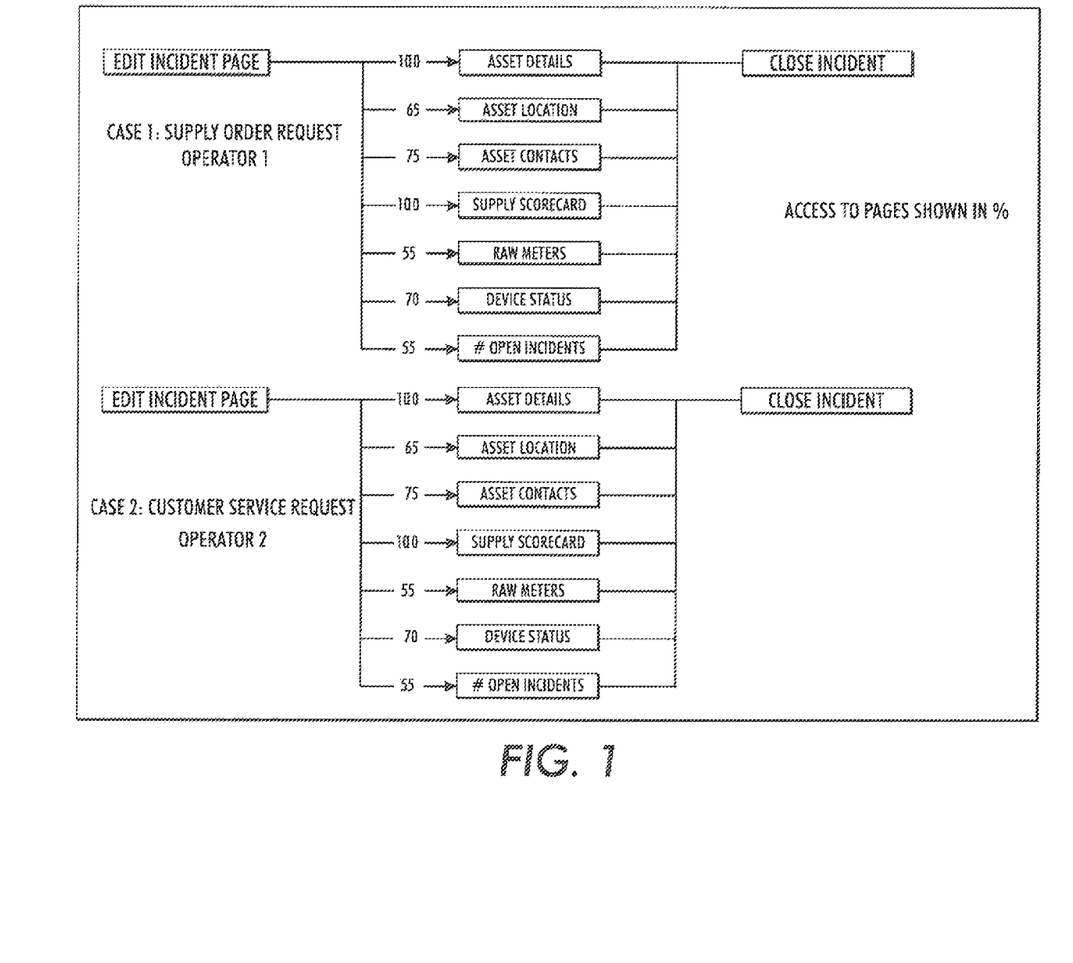
FIG. 1 shows an example where two operators are using the same application but are performing separate jobs in accordance with aspects of the present disclosure.

FIG. 1 shows an example where two operators using the same application are performing separate jobs. In case 1, the operator is responsible for processing supply order requests, and in case 2, the operator is handling customer calls for service. In both cases, each operator begins by starting out in the "Edit Incident" page. For the purpose of this disclosure, this will be referred to as the parent page. From that page, each operator may visit one or more pages in the course of completing the task. In the case of the supply order task (case 1), and over the course of several hundred orders, the operator visits the Supply Scorecard and Device Status page a high percentage of time. However, in case 2 (Call for service), the operator visits the Asset Location, Asset Contacts and Device Status page a high percentage of time over the course of several hundred calls.

Using this data, it is possible to determine for each operator which pages to pre-load once they access the edit Incident page. In the case of operator 1, the Supply Scorecard and Device Status page would be pre-loaded and for operator 2 the Asset Location, Asset Contacts and Device Status page will be pre-loaded.

In the example above and discussed further below, it is assumed that data entered on the Edit Incident page will not have any impact on the content of the pages selected next. That is, regardless of what changes were made on the Edit Incident page, the content of the next page selected will not change. When this is the case, a pre-load of the high percentage page can be made and when displayed, the information on that page will still be valid. However, if data entered on the Edit Incident page influences in any way the content of any subsequent page, then pre-loading can be disabled, either by the client or server, because any information uploaded during the pre-load would have to be discarded and a new (fresh copy) of the page transferred and displayed.

In general, each time a user requests an "Edit Incident" page from the client, the XSM server downloads the page with information for the specified incident number. At the same time, a check is made to determine if intelligent pre-load is enabled, and if it is, checks will be made to determine if any of the pre-load candidates are at or above the limit needed to initiate the pre-load for that user. Each page that meets or exceeds the pre-load limit will then be downloaded to the client and available for selection from the cache.

While displaying the new incident page, there is high likelihood that the user will request one or more of the pre-load candidate pages to be displayed while processing the incident. As previously mentioned, the set of most visited pages will depend on the task being performed. To adjust for this behavior, a set of counters associated with each user can be established to keep track of the parent page (i.e., the New Incident page), what pages were visited, the total number of visits and the time when each page took place. Using this data, a confidence level for each candidate page can be established and pre-loading the appropriate page can be begun once a specific limit has been reached.

Figure 2:
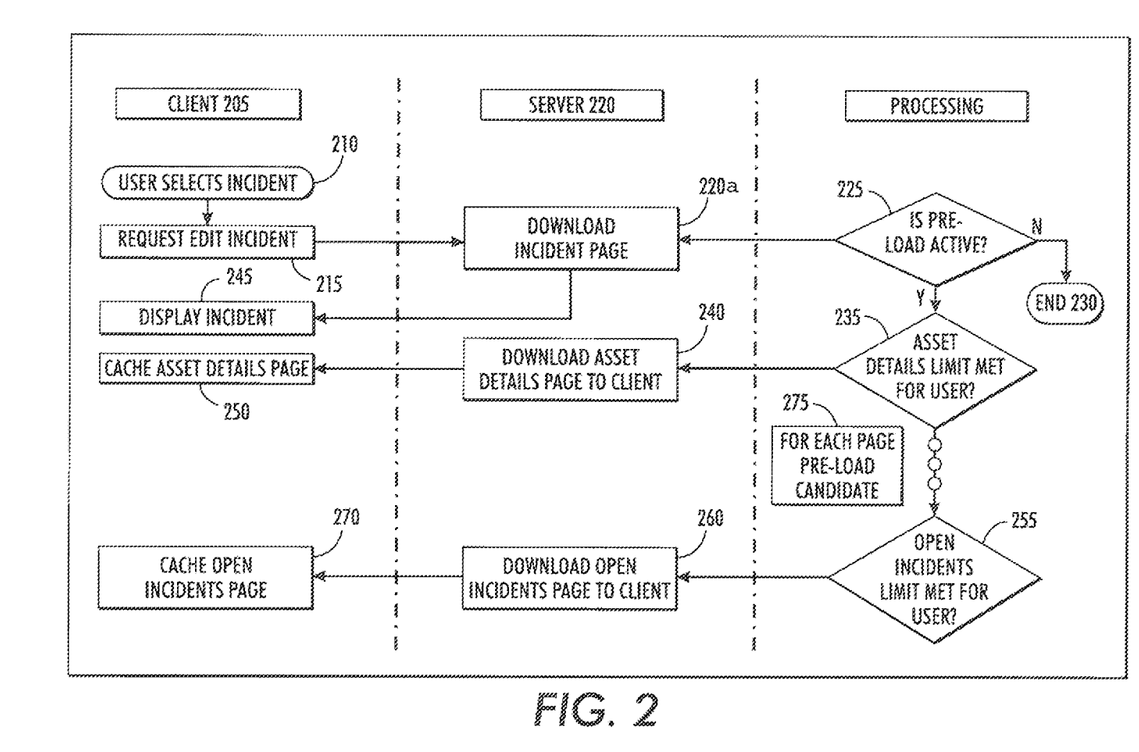
FIG. 2 shows an example process flow for client, server and processing tasks relationship in accordance with aspects of the present disclosure.

FIG. 2 shows an example client, server and processing tasks relationship for when each time a user lands on the New Incident page in XSM. Client 205 selects Incident at 210. A request is made at 215 to server 220 for Edit Incident. Server 220, upon receiving the request from client 205, downloads Incident page to client 205 at 220a and is displayed on client 205 at 245. A determination is made by server 220 at 225 as to whether pre-load is active. If the result of the determination at 225 is negative, the process ends at 230. If the result of the determination at 225 is positive, a determination is made as to whether the Asset Details limit is met at 235. If the result of the determination at 235 is positive, Asset Details page is downloaded to client 205 at 240 and client 205 caches Asset Details page at 250. The determination at 235 is made for each page pre-load candidate at 275. A determination is made by server 220 at 255 as to whether open incidents limit is met for client 205. If the result of the determination at 255 is positive, open incidents page is download to client 205 at 260 and cached at client at 270.

Figure 3:
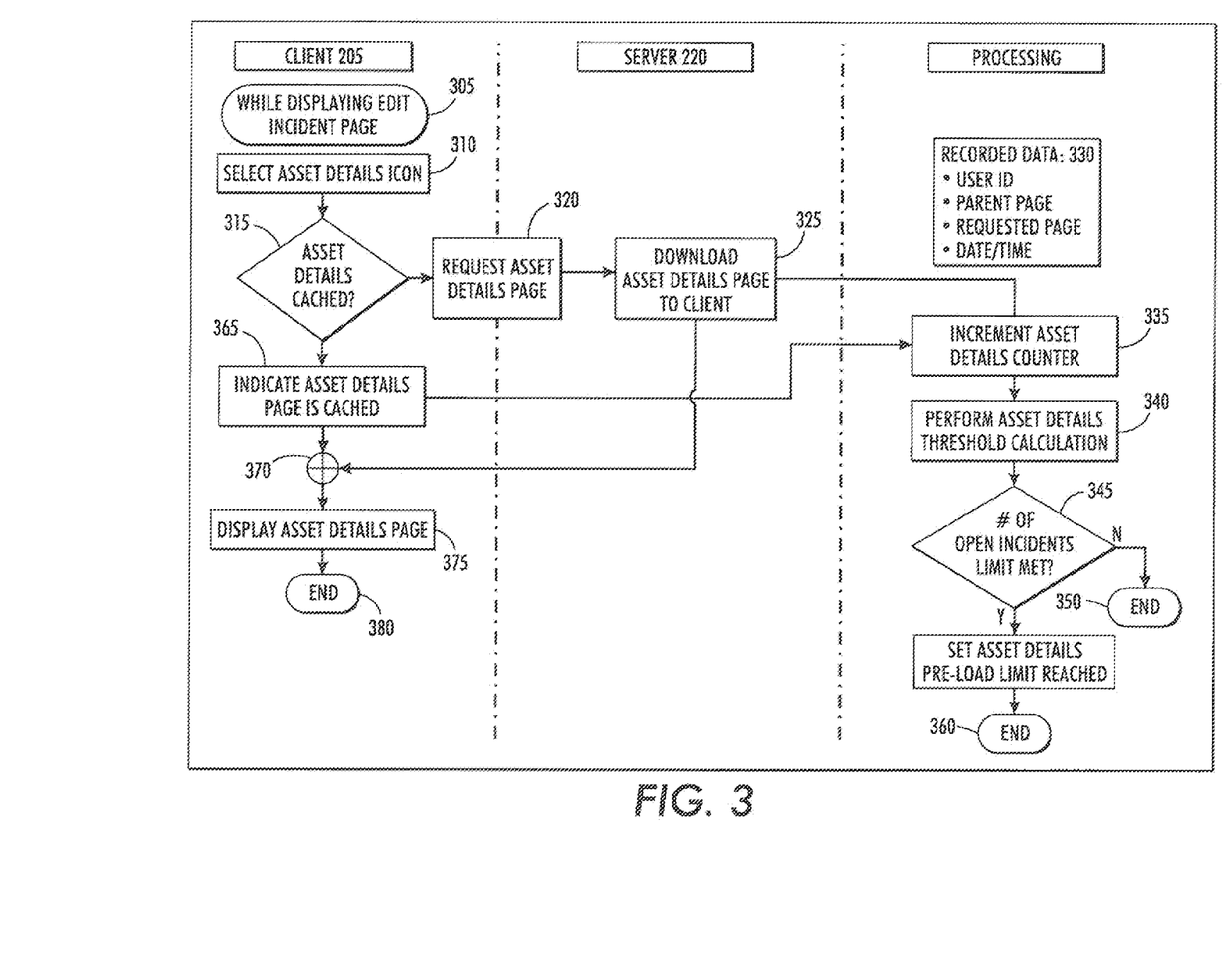
FIG. 3 shows an example process flow for client, server and processing tasks relationship in accordance with aspects of the present disclosure.

FIG. 3 shows an example client, server and processing tasks relationship for when each time a user lands on the Edit Incident page in XSM. While displaying Edit Incident page 305 on client 205 and upon selecting one of the candidate pre-loaded pages while on the parent "Edit Incident" page 310, client 205 determines, at 315, whether the page is already available in cache. If the result of the determination at 315 is negative, a request is made to server 220 to get copy of the page (in this example, the Asset Details page) 320 and at the same time, information about the user requesting the page, the parent page name and the requested page is stored in a table associated with the user at 330. Once Asset Details page is downloaded to client 205 at 325, Asset Details counter is incremented at 335 by server 220.

If the result of the determination at 315 is positive indicating that Asset Details page is cached at 365, then Asset Details page is displayed at 375 and the same information above is sent to server 220 to process and store at 330. Each time this page access information is recorded, a calculation is made at 370 to determine if the user will likely navigate to that page a high percentage of time and if the confidence is high enough to warrant a page pre-load the next time the user accesses the parent page. Once the probability of accessing the page and confidence interval reaches a specified level, the pre-load is enabled for that page for that user. At 335, the Asset Details counter is incremented by server 220. At 340, an Asset Details threshold calculation is performed at server 220. A determination is made at 345 by server 220 as to whether the number of open incidents limit is met. If the result of the determination at 345 is negative, then the process ends at 350. If the result of the determination at 345 is positive, then the Asset Details pre-load limit is set as being reached at 355 and then the process ends at 360. Asset Details page is display on client 205 at 375 and then the process ends at 380.

In some aspects, intelligent pre-load Threshold calculation can be performed by either client 205, server 220 or by another module (not shown). Candidate pre-load pages will begin to be downloaded to the client once there is a high enough degree of certainty that the downloaded pages will be accessed a high percentage of time. To determine this, data recorded with each candidate page access is used as follows:

$N_t$=Total number of times the parent (Edit Incident) page is accessed by this user in a specified time period $n_{c1}$ to $n_{c7}$=Number of times the candidate pages 1 through 7 are accessed in the specified time period t=Specified period of time in weeks (typically set to 1 week)

$P_{c1}$ to $P_{c7}$=Percent of the time an individual pre-loaded page is requested from the parent C=Confidence indicator $P_t$=Percentage threshold: The percentage above which a candidate pre-load page will begin to be downloaded when the parent page is accessed $C_t$=Confidence threshold: The number of parent pages accesses above which a candidate pre-load page will begin to be downloaded when the parent page is accessed In some aspects, both $P_t$ and $C_r$ must be met before pre-load begins for a given candidate page. From this, the probability of pre-load page P1 (Asset Details Page) being accessed after the user accesses the parent Edit Incident page is $P_{c1}=n_{c1}/N_t$.

In some aspects of the present disclosure, the confidence indicator can be set when simple count of the number of parent page accesses exceeds a threshold. In some aspects, for example, a production environment such as XSM, a given operator may access the edit incident page several hundred times during the course of a week, and in some cases, a minimum of 100 accesses of parent page will be sufficient. From this: C=1 (Set) when $N_t > C_t$.

A performance model can be used as a way of estimating the net savings from using aspects of the present disclosure. Based on an assumption of 100 access to the primary (Edit Incident) page, the amount of time spent visiting each of the candidate pages can be calculated based on the percentage of times the page is visited, the page display time (with and without pre-load) and whether pre-load is turned on for that page.

Model Parameters can include:
- Candidate Page=The name of the candidate pages that may or may not be visited during the course of processing an incident
- Page Visit Rate=The percent of time the candidate page is visited
- Preload Display Time=The amount of time it takes to display a page assuming it has been pre-loaded
- Non-preload display time=The time to display the page if it has not been pre-loaded
- Enable Pre-Load=Switches from "No" to "Yes" once the Page Visit Rate is high enough to begin pre-load
- Path Time=Based on the parameters above, the amount of time needed to display the associated page over the course of 100 primary page visits
- Total Display Time=The total time needed to access all of the candidate pages visited over the course of 100 visits to the primary (Edit Incident) page.

Figure 4:
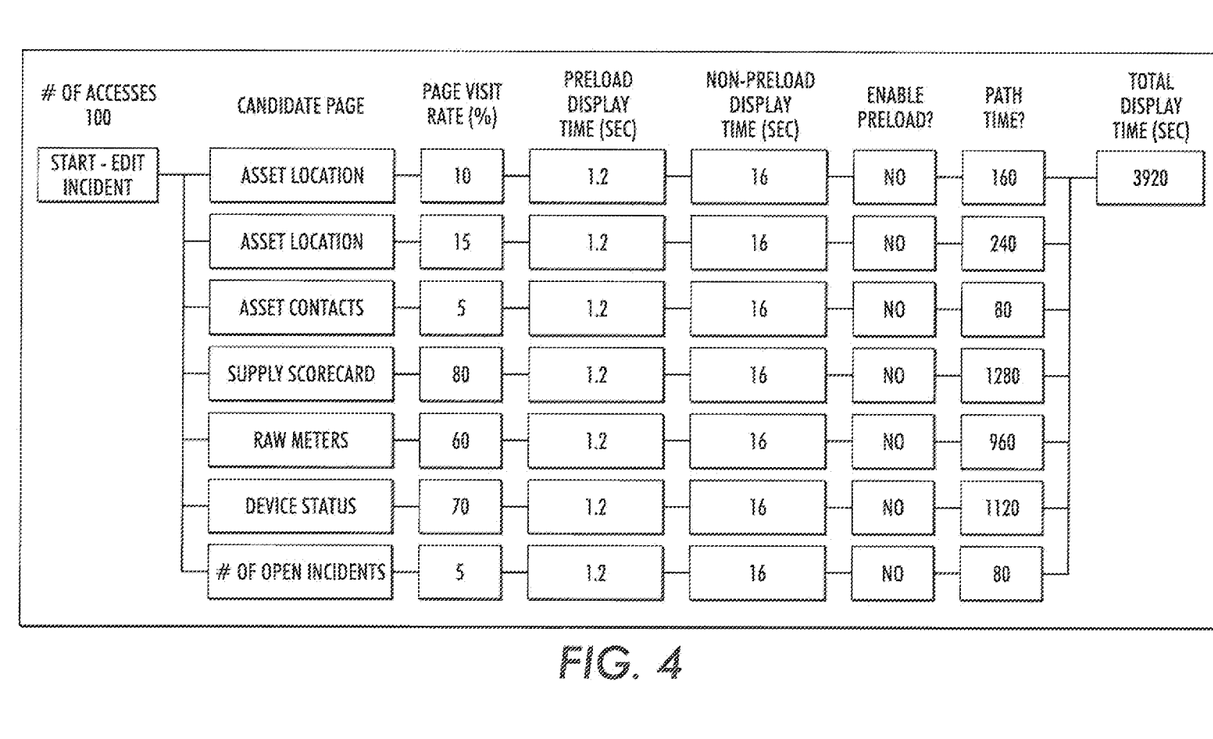
FIG. 4 shows results of a performance model in accordance with aspects of the present disclosure.
Figure 5:
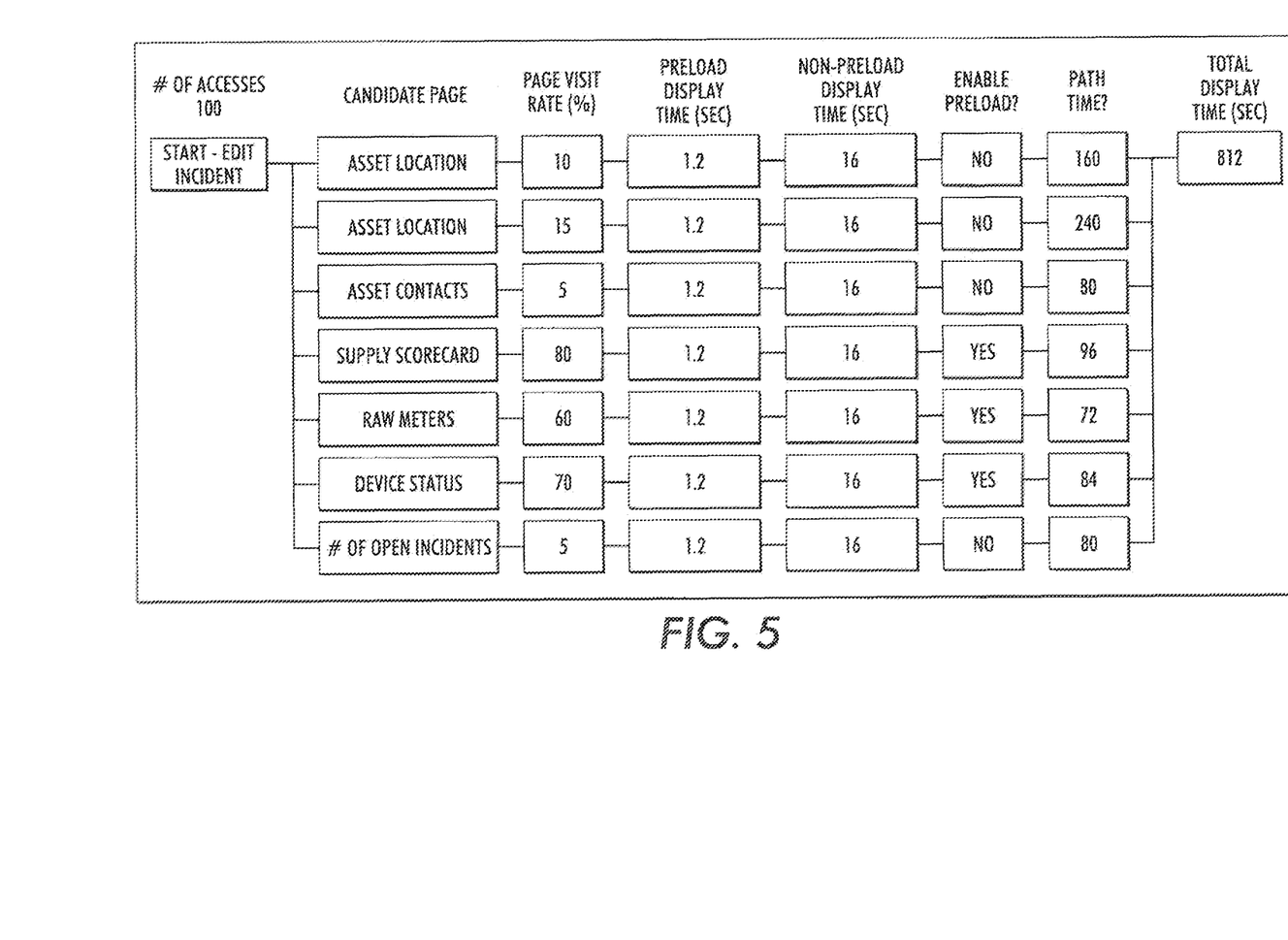
FIG. 5 shows results of a performance model in accordance with aspects of the present disclosure.

Results of the model are shown in FIGS. 3 and 4. FIG. 4 shows Case 1 where pre-load was not enabled for any candidate pages. Keeping the page visit rates constant and using an average of 16 seconds to display each of the candidate pages, the total display time is 3920 seconds (65.3 minutes). FIG. 5 shows case 2 where pre-load was enabled for Supply Scorecard, Raw Meters and Device Status pages. Keeping the page visit rates constant and using an average of 1.2 seconds to display each of the candidate pages, the total display time is 812 second (13.5 minutes). Thus, the total savings of 51.8 minutes, which is approximately 80% savings, can be achieved.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Further, in describing representative embodiments of the present disclosure, the specification may have presented the method and/or process of the present disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequence may be varied and still remain within the spirit and scope of the present disclosure.

Any of the functions described as being performed by a module, component or system can in some embodiments be performed by one or more other modules, component or system. One or more functions described as being performed by different modules, components or systems can be combined to be performed by one or more common module, component or system.

Although aspects of the present disclosure have been described using terms, such as, "client" and "server," these terms are merely used for convenience in describing example aspects of the present disclosure and not to imply any dependency or strict client-server computer-type relationship. The "client" and "server," as used throughout this disclosure may have a peer relationship that have similar computational functionality and that can both function as a "client" or "server" depending on a particular application or requirement of a particular aspect of the present disclosure.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause an effect relationship).

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A method comprising:
   monitoring, by a processor, a predetermined number of web pages viewed by a user;
   determining a likelihood that the user is interested in a related web page based on previously viewed web pages;
   comparing the determined likelihood against a predetermined threshold value;
   preloading the related web page for viewing by the user if the determined likelihood is greater than the predetermined threshold value; and
   displaying the preloaded related web page.

2. The method according to claim 1, further comprising determining if the predetermined number of web pages is greater than a threshold value.

3. The method according to claim 1, wherein the predetermined number of web pages and the related web page have a predetermined relationship.

4. The method according to claim 2, wherein the threshold value is based on a time frame and a number of web page views.

5. The method according to claim 4, wherein the number of web page views is about between 50 and 200.

6. The method according to claim 4, wherein the time frame is about between 3 and 15 days.

7. The method according to claim 3, wherein the predetermined relationship includes a sequence of web pages for a web-based application.

8. An apparatus comprising:
   a controller in communication with machine-readable medium that when executed by the controller cause the controller to:
   monitor a predetermined number of web pages viewed by a user;
   determine a likelihood that the user is interested in a related web page based on previously viewed web pages;
   compare the determined likelihood against a predetermined threshold value;
   preload the related web page for viewing by the user if the determined likelihood is greater than the predetermined threshold value; and
   display the preloaded related web page.

9. The apparatus according to claim 8, wherein the controller is configured to determine if the predetermined number of web pages is greater than a threshold value.

10. The apparatus according to claim 8, wherein the predetermined number of web pages and the related web page have a predetermined relationship.

11. The apparatus according to claim 10, wherein the threshold value is based on a time frame and a number of web page views.

12. The apparatus according to claim 11, wherein the number of web page views is about between 50 and 200.

13. The apparatus according to claim 11, wherein the time frame is about between 3 and 15 days.

14. The apparatus according to claim 10, wherein the predetermined relationship includes a sequence of web pages for a web-based application.

15. An article of manufacture comprising:
a machine-readable medium that when executed by a controller cause the controller to:
monitor a predetermined number of web pages viewed by a user;
determine a likelihood that the user is interested in a related web page based on previously viewed web pages;
compare the determined likelihood against a predetermined threshold value;
preload the related web page for viewing by the user if the determined likelihood is greater than the predetermined threshold value; and
display the related web page.

16. The article of claim 15, wherein the controller is arranged on a first computer coupled to a network.

17. The article of claim 16, wherein web pages viewed are displayed on a display coupled to a second computer coupled to the network.

* * * * *